United States Patent
Shao et al.

(10) Patent No.: US 12,038,139 B2
(45) Date of Patent: Jul. 16, 2024

(54) METHOD FOR FROST HEAVE PREVENTION TREATMENT OF SMART GAS PIPELINE AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Bin Liu, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/465,958

(22) Filed: Sep. 12, 2023

(65) Prior Publication Data

US 2023/0417373 A1 Dec. 28, 2023

Related U.S. Application Data

(63) Continuation of application No. 18/171,392, filed on Feb. 20, 2023, now Pat. No. 11,821,589.

(30) Foreign Application Priority Data

Dec. 22, 2022 (CN) .......................... 202211653226.2

(51) Int. Cl.
*F17D 5/00* (2006.01)
*F17D 1/05* (2006.01)
(Continued)

(52) U.S. Cl.
CPC ............... *F17D 5/005* (2013.01); *F17D 1/05* (2013.01); *F17D 1/20* (2013.01); *F17D 3/01* (2013.01);
(Continued)

(58) Field of Classification Search
CPC ... F17D 5/005; F17D 1/05; F17D 1/20; F17D 3/01; G06Q 10/04; G06Q 10/0631; G06Q 10/06312; G06Q 50/06; Y02P 90/02
(Continued)

(56) References Cited

U.S. PATENT DOCUMENTS 2,693,351 A 11/1954 Riley et al.
8,600,566 B1 12/2013 Longo et al.
(Continued)

FOREIGN PATENT DOCUMENTS

CN 201364061 Y 12/2009
CN 105912844 A 8/2016
(Continued)

OTHER PUBLICATIONS

"Cause Analysis and Solution of Frost Heaving of Underground Natural Gas Pipeline", Web page <http://www.guandaobaohuchina.com/htm/20197/33_2160.htm#>, Jul. 17, 2019.
(Continued)

*Primary Examiner* — Minh Q Le
(74) *Attorney, Agent, or Firm* — METIS IP LLC (57) ABSTRACT

The present disclosure provides a method for frost heave prevention treatment of a smart gas pipeline and an Internet of Things system. The method includes: determining gas pressure change data of a target point based on gas transmission data of the target point and gas pipeline data of the target point; predicting temperature change data of the target point through a temperature model based on the gas pressure change data of the target point; and predicting, based on the temperature change data of the target point, the gas pipeline data of the target point, and the gas pressure change data of the target point, and in combination with environmental data of the target point, frost heave degree data of the target point.

17 Claims, 5 Drawing Sheets

(51) Int. Cl.
*F17D 1/20* (2006.01)
*F17D 3/01* (2006.01)
*G06Q 10/04* (2023.01)
*G06Q 10/0631* (2023.01)
*G06Q 50/06* (2012.01)

(52) U.S. Cl.
CPC ......... *G06Q 10/04* (2013.01); *G06Q 10/0631* (2013.01); *G06Q 10/06312* (2013.01); *G06Q 50/06* (2013.01); *Y02P 90/02* (2015.11)

(58) Field of Classification Search
USPC .............................................. 137/455, 487.5
See application file for complete search history.

(56) References Cited

U.S. PATENT DOCUMENTS

| | | |
|---|---|---|
| 2002/0117214 A1 | 8/2002 | Tucker et al. |
| 2003/0167919 A1* | 9/2003 | Schempf .................. F17D 3/01 95/15 |
| 2004/0059692 A1 | 3/2004 | Hill et al. |
| 2012/0191262 A1 | 7/2012 | Marcus |
| 2013/0030577 A1 | 1/2013 | Jarrell et al. |
| 2013/0085690 A1 | 4/2013 | Fei et al. |
| 2013/0307701 A1 | 11/2013 | Forster-Knight |
| 2018/0031396 A1 | 2/2018 | Bohlin et al. |
| 2018/0180224 A1* | 6/2018 | Pringle .................. F17C 13/02 |
| 2018/0274731 A1* | 9/2018 | Ethridge .................. F17D 1/04 |
| 2019/0066479 A1 | 2/2019 | Wesley et al. |
| 2019/0254242 A1* | 8/2019 | Allen ..................... G06Q 10/04 |
| 2019/0303791 A1* | 10/2019 | Yoshikawa ............ G06N 20/00 |
| 2020/0320650 A1 | 10/2020 | Agouridis et al. |
| 2020/0348131 A1 | 11/2020 | Taniguchi et al. |
| 2020/0370990 A1 | 11/2020 | Chang |
| 2021/0116076 A1 | 4/2021 | Ward et al. |
| 2021/0239486 A1 | 8/2021 | Liang et al. |
| 2022/0178590 A1 | 6/2022 | Toussaint et al. |
| 2023/0094640 A1 | 3/2023 | Shao et al. |
| 2023/0153827 A1 | 5/2023 | Shao et al. |
| 2023/0205187 A1 | 6/2023 | Shao et al. |
| 2023/0213370 A1 | 7/2023 | Shao et al. |
| 2023/0213917 A1 | 7/2023 | Shao et al. |
| 2023/0214790 A1 | 7/2023 | Shao et al. |
| 2023/0221207 A1 | 7/2023 | Shao et al. |
| 2023/0221695 A1 | 7/2023 | Shao et al. |
| 2023/0222384 A1 | 7/2023 | Shao et al. |
| 2023/0228364 A1 | 7/2023 | Shao et al. |
| 2023/0228608 A1 | 7/2023 | Shao et al. |
| 2023/0230018 A1 | 7/2023 | Shao et al. |
| 2023/0230050 A1 | 7/2023 | Shao et al. |
| 2023/0247138 A1 | 8/2023 | Shao et al. |

FOREIGN PATENT DOCUMENTS

| | | |
|---|---|---|
| CN | 109063951 A | 12/2018 |
| CN | 110377879 A | 10/2019 |
| CN | 111798089 A | 10/2020 |
| CN | 112989591 A | 6/2021 |
| CN | 113807655 A | 12/2021 |

OTHER PUBLICATIONS

Zhang, Zhou, Research on Frost heave Characteristics and Optimization Design of Gas Pressure Regulating Station Pipeline in Beijing Area, Professional Master Dissertation of Beijing University of Civil Engineering and Architeciure, 2018, 70 pages.

Rong, Hailun et al., Numerical Simulation Research on Anti-frost Heave of Pipeline Foundation at Natural Gas Distribution Station, Petroleum Engineering Construction, 43(5): 47-50, 2017.

Rajith Dayarathne et al., Centrifuge Modelling of Gas Pipelines Undergoing Freeze-thaw Cycles, Canadian Geotechnical Journal, 2021, 53 pages.

* cited by examiner

METHOD FOR FROST HEAVE PREVENTION TREATMENT OF SMART GAS PIPELINE AND INTERNET OF THINGS SYSTEM THEREOF

CROSS-REFERENCE TO RELATED DISCLOSURES

This application is a continuation of U.S. application Ser. No. 18/171,392, filed on Feb. 20, 2023, which claims priority to Chinese Patent Application 202211653226.2, filed on Dec. 22, 2022, the entire contents of which are hereby incorporated by reference.

TECHNICAL FIELD

The present disclosure relates to the field of smart gas, and in particular to method for frost heave prevention treatment of smart gas pipeline and Internet of Things system.

BACKGROUND

When transporting gas to downstream users, with the continuous change of gas supply pressure and flow rate, the pressure before and after pressure regulation is quite different. Due to Joule-Thomson effect, the temperature of distributed gas is easy to drop below freezing point, and the soil around the pipeline freezes, resulting in the "frost heave" phenomenon. That is, the valve body leaves the valve seat, the ground cracks, the pipeline deforms, and local stress concentration occurs, etc., which affects the safe transportation of gas pipeline.

Therefore, it is needed to provide a method for frost heave prevention treatment of smart gas pipeline, which can predict the phenomenon of frost heave in advance and take preventive measures in time to avoid the increase of pipeline risk.

SUMMARY

In the first aspect, one or more embodiments of the present disclosure provide a method for frost heave prevention treatment of a smart gas pipeline. The method is executed based on a smart gas pipeline network safety management platform of an Internet of Things system for frost heave prevention treatment of the smart gas pipeline. The method comprises: determining gas pressure change data of a target point based on gas transmission data of the target point and gas pipeline data of the target point; predicting temperature change data of the target point through a temperature model based on the gas pressure change data of the target point, wherein the temperature change data of the target point includes gas temperature change data and soil temperature change data, and the temperature model is a machine learning model, wherein the temperature model at least includes a gas feature extraction layer, a first temperature layer, and a second temperature layer; an input of the gas feature extraction layer includes the gas transmission data of the target point and the gas pipeline data of the target point, and an output of the gas feature extraction layer includes the gas pressure change data of the target point; an input of the first temperature layer includes the gas pressure change data of the target point and the gas transmission data of the target point, and an output of the first temperature layer includes the gas temperature change data; and an input of the second temperature layer includes the gas temperature change data and the gas pipeline data of the target point, and an output of the second temperature layer includes the soil temperature change data; and predicting, based on the temperature change data of the target point, the gas pipeline data of the target point, and the gas pressure change data of the target point, and in combination with environmental data of the target point, frost heave degree data of the target point.

In the second aspect, one or more embodiments of the present disclosure provide an Internet of Things system for frost heave prevention treatment of a smart gas pipeline. The Internet of Things system includes a smart gas user platform, a smart gas service platform, a smart gas pipeline network sensor network platform, a smart gas pipeline network safety management platform, and a smart gas pipeline network object platform. The Internet of Things system is configured to: determine gas pressure change data of a target point based on gas transmission data of the target point and gas pipeline data of the target point; predict temperature change data of the target point through a temperature model based on the gas pressure change data of the target point, wherein the temperature change data of the target point includes gas temperature change data and soil temperature change data, and the temperature model is a machine learning model, wherein the temperature model at least includes a gas feature extraction layer, a first temperature layer, and a second temperature layer; an input of the gas feature extraction layer includes the gas transmission data of the target point and the gas pipeline data of the target point, and an output of the gas feature extraction layer includes the gas pressure change data of the target point; an input of the first temperature layer includes the gas pressure change data of the target point and the gas transmission data of the target point, and an output of the first temperature layer includes the gas temperature change data; and an input of the second temperature layer includes the gas temperature change data and the gas pipeline data of the target point, and an output of the second temperature layer includes the soil temperature change data; and predict, based on the temperature change data of the target point, the gas pipeline data of the target point, and the gas pressure change data of the target point, and in combination with environmental data of the target point, frost heave degree data of the target point.

In the third aspect, one or more embodiments of the present disclosure provide a non-transitory computer-readable storage medium, the storage medium stores computer instructions, and when the computer reads the computer instructions in the storage medium, the computer executes the above method.

BRIEF DESCRIPTION OF THE DRAWINGS

The present disclosure is further illustrated in terms of exemplary embodiments. These exemplary embodiments are described in detail with reference to the drawings. These embodiments are non-limiting, in which like reference numerals represent similar structures, wherein.

DETAILED DESCRIPTION

In order to more clearly explain the technical scheme of the embodiments of this disclosure, a brief description of the accompanying drawings required for the description of the embodiment is given below. Obviously, the accompanying drawings below are only some examples or embodiments of this description, and it is possible for ordinary technicians skilled in the art to apply this description to other similar scenarios according to these accompanying drawings without creative effort. Unless otherwise apparent from context or otherwise indicated, like reference numerals in the figures represent like structures or operations.

It should be understood that the "system", "equipment", "unit" and/or "module" used in this disclosure are a method used to distinguish different components, elements, parts, portions or assemblies of different levels. However, if other words may achieve the same purpose, the words may be replaced by other expressions.

As shown in this description and claims, the words "one", "a", "a kind" and/or "the" are not special singular but may include the plural unless the context expressly suggests otherwise. In general, the terms "comprise," "comprises," and/or "comprising," "include," "includes," and/or "including," merely prompt to include steps and elements that have been clearly identified, and these steps and elements do not constitute an exclusive listing. The methods or equipment may also include other steps or elements.

The flowcharts used in the present disclosure illustrate operations that the system implements according to some embodiments of the present disclosure. It should be understood that the preceding or following operations are not necessarily performed in the exact order. Instead, each step may be processed in reverse or simultaneously. Moreover, one or more other operations may be added to the flowcharts or one or more operations may be removed from the flowcharts.

Figure 1:
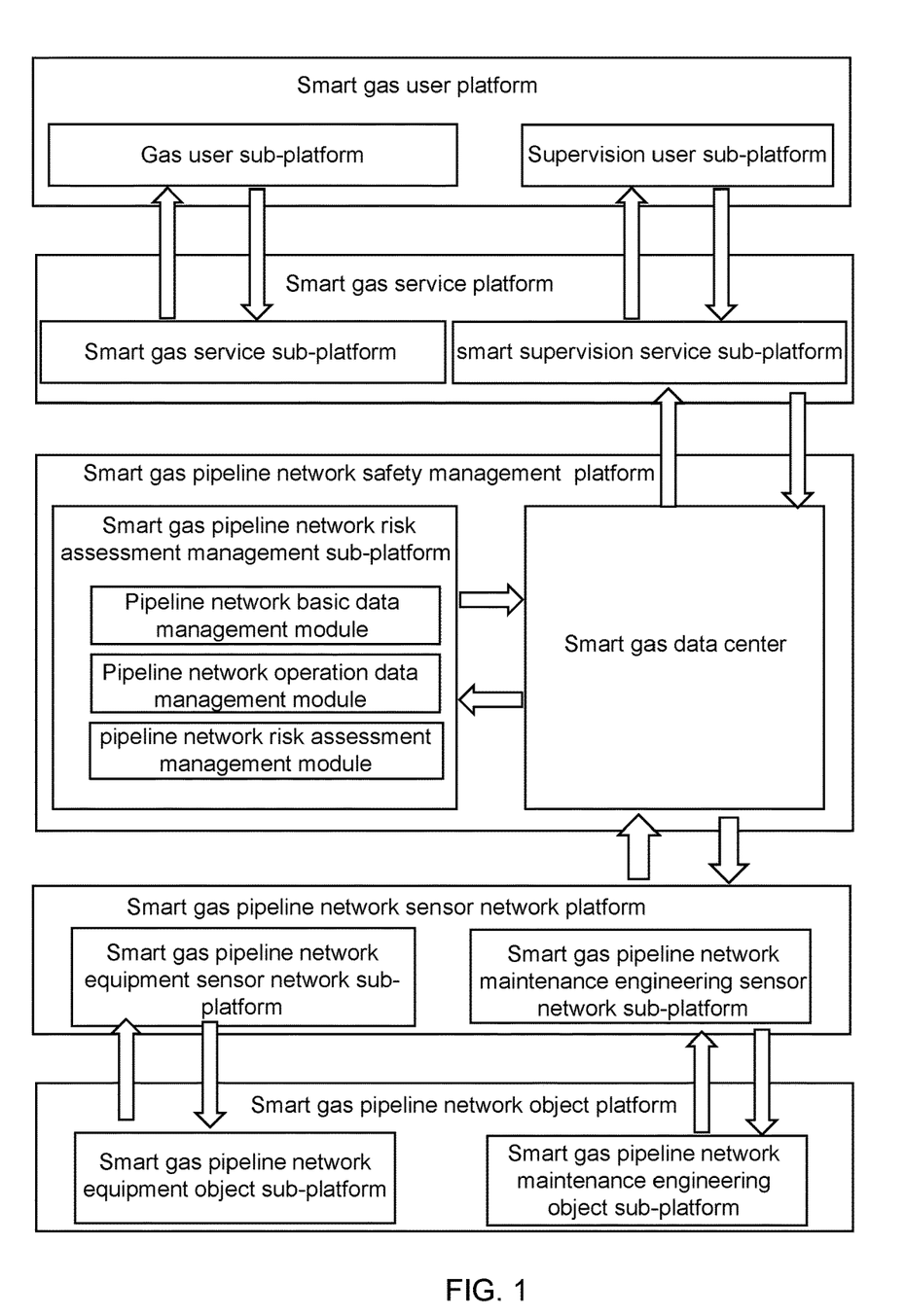
FIG. 1 is a structural diagram of an Internet of Things system for smart gas pipeline frost heave safety management according to some embodiments of the present disclosure.

FIG. 1 is a structural diagram of an Internet of Things system for smart gas pipeline frost heave safety management according to some embodiments of the present disclosure. As shown in FIG. 1, in some embodiments, the Internet of Things system 100 for smart gas pipeline frost heave safety management may at least include a smart gas user platform, a smart gas service platform, a smart gas pipeline network safety management platform, a smart gas pipeline network sensor network platform, and smart gas pipeline network object platform.

In some embodiments, the Internet of Things system 100 for smart gas pipeline frost heave safety management may monitor gas pipeline and pipeline network equipment in the gas pipeline network, obtain monitoring data, evaluate possible risk based on the monitoring data, and generate corresponding management plans for possible risk. For example, by monitoring the gas pipeline in a certain area and the surrounding environment of the pipeline (for example, soil temperature, soil humidity or other facilities), the risk of pipeline network frost heave is assessed so as to generate the plans to deal with this risk, such as adjusting the gas transmission data and determining the frost heave prevention plan.

In some embodiments, the Internet of Things system 100 for smart gas pipeline frost heave safety management may process monitoring information (such as basic data and operation data) of gas pipelines and pipeline network equipment, and then evaluate corresponding risk value. When the risk value exceeds the preset threshold, the Internet of Things system 100 for smart gas pipeline frost heave safety management may send an alarm to the user.

In some embodiments, the Internet of Things system 100 for smart gas pipeline frost heave safety management may also determine the corresponding strategies of pipeline network maintenance, inspection, or risk troubleshooting according to the evaluation of the risk value, and manage the gas pipeline network system according to the aforementioned strategies to ensure safe operation of the pipeline network.

The smart gas user platform refers to a user-oriented platform, which interacts with users. A user may be a gas user, a supervision user, or the like. In some embodiments, the smart gas user platform may be configured as terminal equipment. For example, terminal equipment may include mobile equipment, tablet computers, or any combination thereof. In some embodiments, the smart gas user platform may feed information back to users through terminal equipment. For example, the smart gas user platform may feed gas safety warning information back to users through terminal equipment (such as display).

In some embodiments, the smart gas user platform may include a gas user sub-platform. The gas user sub-platform is aimed at gas user. Gas user may refer to a user who actually use gas, such as consumers.

In some embodiments, the gas user sub-platform may perform data interaction with the smart gas service sub-platform of the smart gas service platform. For example, the gas user sub-platform may receive pipeline frost heave safety management information uploaded by the smart gas service sub-platform of the smart gas service platform. Pipeline frost heave safety management information refers to information related to pipeline frost heave safety, such as frost heave degree data, frost heave prevention plan, etc. For more information about the frost heave degree data and the frost heave prevention plan, please refer to the relevant descriptions in FIG. 2. Gas users may obtain pipeline frost heave safety management information through the gas user sub-platform.

In some embodiments, the smart gas user platform may include a supervision user sub-platform. The supervision user sub-platform may supervise the operation of the entire Internet of Things system for supervision user. Supervision user refers to user of the gas safety supervision department. Supervision user may obtain pipeline network safety risk warning information through the gas user sub-platform, and may also obtain strategies of pipeline network maintenance, inspection, and troubleshooting.

The smart gas service platform may be a platform for receiving and transmitting data and/or information. The smart gas service platform may exchange data with the smart gas user platform and the smart gas pipeline network safety management platform. In some embodiments, the smart gas service platform may upload the pipeline frost heave safety management information to the smart gas user platform.

In some embodiments, the smart gas service platform may include a smart gas service sub-platform. The smart gas service sub-platform may exchange data with the gas user sub-platform to provide gas user with pipeline frost heave safety management information.

In some embodiments, the smart gas service platform may include a smart gas service sub-platform and a smart supervision service sub-platform. The smart gas service platform may exchange data with supervision user sub-platform, and provide supervision user with safety management information on pipeline frost heave.

The smart gas pipeline network safety management platform may refer to a platform for coordinating the connection and collaboration among various functional platforms. In some embodiments, the smart gas equipment pipeline network safety management platform may receive the gas transmission data uploaded by the smart gas pipeline network sensor network platform, analyze and process the gas transmission data, and upload the processed data to the smart gas user platform. For example, the smart gas pipeline network safety management platform may obtain gas transmission data and gas pipeline data, determine the gas pressure change data of the target point based on the gas transmission data and gas pipeline data, predict the temperature change data of the target point based on the gas pressure change data, and predict, based on temperature change data, gas pipeline data, and gas pressure change data, and in combination with environmental data, a frost heave degree data of the target point, determine, based on the frost heave degree data of the target point, the gas transmission adjustment data and a frost heave prevention plan.

In some embodiments, the smart gas pipeline network safety management platform may include a smart gas pipeline network risk assessment sub-platform and a smart gas data center.

In some embodiments, the smart gas pipeline network safety management platform may exchange information with the smart gas service platform and the smart gas pipeline network sensor network platform through the smart gas data center.

The smart gas pipeline network risk assessment management sub-platform refers to the platform used to process and analyze relevant data of the pipeline network, such as processing and risk assessment of gas transmission data, and sending the risk assessment results (for example, frost heave degree data, frost heave prevention plan, etc.) to the smart gas service platform. In some embodiments, the smart gas pipeline network risk assessment management sub-platform may include one or more of a pipeline network basic data management module, a pipeline network operation data management module, and a pipeline network risk assessment management module.

The pipeline network basic data management module may store, process, and analyze the pipeline network basic data (such as gas pipeline data including pipeline environment, material, life and corrosion protection, etc.), and monitor explosion-proof safety such as pipeline mechanical leakage, electrical power consumption (smart control power consumption, communication power consumption, etc.), and valve control.

The pipeline network operation data management module may store, process, and analyze pipeline network operation data (for example, gas transmission data, etc.), and perform safety monitoring of gas transmission data, leakage data, maintenance status, illegal equipment information, and illegal access.

The pipeline network risk assessment management module may assess the risk of the processing results of the pipeline network operation data management module. For example, the pipeline network risk assessment management module may assess the safety risks of frost heave severity, abnormal gas flow, gas pressure, strong magnetic interference, low voltage, etc. according to the pipeline network basic data and the pipeline network operation data, and classify the safety risks according to the assessment results, and carry out three-dimensional visual management with different colors in combination with Geographic Information System (GIS).

The smart gas data center may summarize and store all the operating data of the Internet of Things system 100 for smart gas pipeline frost heave safety management. The smart gas pipeline network risk assessment management sub-platform may interact with the smart gas data center in two directions. In some embodiments, the smart gas data center may receive the data uploaded by the smart gas pipeline network sensor network platform, and send the data to the smart gas pipeline network risk assessment management sub-platform for analysis and processing. For example, the smart gas data center may send gas transmission data to the smart gas pipeline network risk assessment management sub-platform for analysis and processing, and the smart gas pipeline network risk assessment management sub-platform may send the processed gas transmission data to the smart gas data center.

The smart gas pipeline network sensor network platform may be a functional platform for sensor communication management. In some embodiments, the smart gas pipeline network sensor network platform may be configured as a communication network and a gateway.

In some embodiments, the smart gas pipeline network sensor network platform may perform data interaction with the smart gas pipeline network safety management platform and the smart gas pipeline network object platform to realize the functions of sensing information sensing communication and controlling information sensing communication. For example, the smart gas pipeline network sensor network platform may receive the gas transmission data uploaded by the smart gas pipeline network object platform, or issue an instruction for obtaining gas transmission data to the smart gas pipeline network object platform. For another example, the smart gas pipeline network sensor network platform may receive the instruction issued by the smart gas data center to obtain gas transmission data, and upload the gas transmission data to the smart gas data center.

In some embodiments, the smart gas pipeline network sensor network platform may include a smart gas pipeline network equipment sensor network sub-platform, and the smart gas pipeline network equipment sensor network sub-platform may perform data interaction with the smart gas pipeline network object platform, for example, the smart gas pipeline network equipment sensor network sub-platform may receive the gas transmission data uploaded by the smart gas pipeline network object platform, or issue an instruction for obtaining gas transmission data to the smart gas pipeline network object platform. In some embodiments, the smart gas pipeline network sensor network platform may include a plurality of smart gas pipeline network equipment sensor network sub-platforms for monitoring different pipeline network areas.

In some embodiments, the smart gas network sensor platform may include a smart gas pipeline network maintenance engineering sensor network sub-platform, which may perform data interaction with the smart gas pipeline network object platform. For example, the smart gas pipeline network maintenance engineering sensor network sub-platform may receive the gas transmission data uploaded by the smart gas pipeline network object platform, and generate strategies of network maintenance, inspection, troubleshooting, etc. according to the evaluation results of the pipeline network risk assessment management module to ensure the safety of the pipeline network operation.

The smart gas pipeline network object platform may refer to the functional platform used to obtain perceptual information. In some embodiments, the smart gas pipeline network object platform may be configured as at least one sensor (for example, a gas transmission sensor, a gas pipeline sensor, an environment sensor, etc.). The sensor is configured with a unique identifier, which may be used for the smart gas pipeline network safety management platform to control the sensors deployed in different areas of the pipeline network. In some embodiments, the smart gas pipeline network object platform may perform data interaction with the smart gas pipeline network equipment sensor network platform, and upload the obtained gas transmission data to the smart gas pipeline network sensor network platform.

In some embodiments, the smart gas pipeline network object platform may include a smart gas pipeline network equipment object sub-platform, and the smart gas pipeline network equipment object sub-platform may perform data interaction with the smart gas pipeline network sensor network platform. For example, the smart gas pipeline network equipment object sub-platform may upload gas transmission data to the smart gas pipeline network equipment sensor network sub-platform, or receive an instruction for obtaining gas transmission data issued by the smart gas pipeline network equipment sensor network sub-platform. In some embodiments, the smart gas pipeline network object platform may include a plurality of smart gas pipeline network equipment object sub-platforms for monitoring different pipeline network areas.

In some embodiments, the smart gas pipeline network object platform may include a smart gas pipeline network maintenance engineering object sub-platform, and the smart gas pipeline network maintenance engineering object sub-platform may perform data interaction with the smart gas pipeline network sensor network platform. For example, the smart gas pipeline network maintenance engineering object sub-platform may receive the evaluation results of the pipeline network risk assessment management module, and generate strategies of pipeline network maintenance, inspection, and troubleshooting, etc., to ensure the safety of pipeline network operation.

It should be noted that the above description of the Internet of Things system for the gas pipeline frost heave safety management and its platform is only for the convenience of description, and does not limit this description to the scope of the examples mentioned. It may be understood that after understanding the principle of the system, those skilled in the art may arbitrarily combine each module or form a sub-system to connect with other modules without departing from this principle. In some embodiments, the smart gas user platform and the smart gas service platform disclosed in FIG. 1 may be different platforms in one system, or one platform may realize the functions of the above-mentioned two or more platforms. For example, each platform may share one storage module, or each platform may have its own storage module. Such deformations are within the protection scope of the present disclosure.

Figure 2:
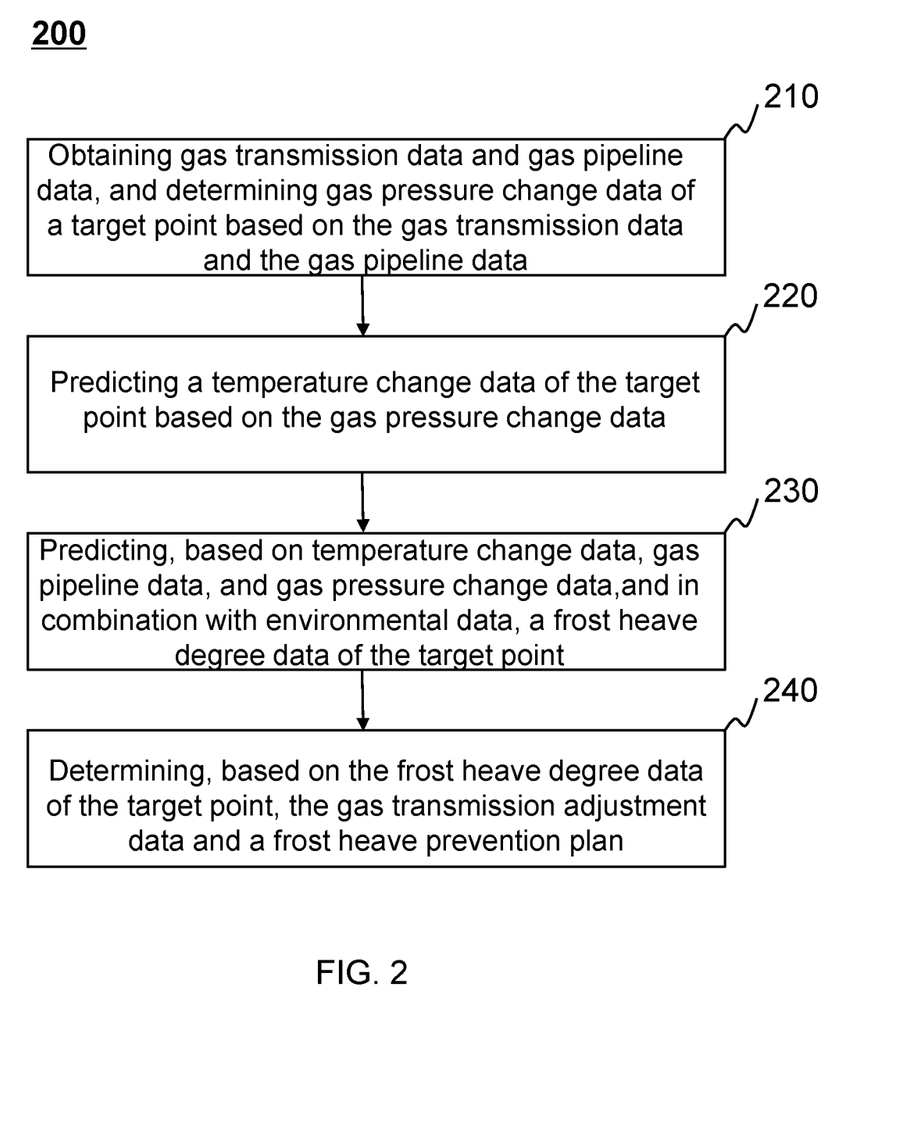
FIG. 2 is an exemplary flowchart illustrating a process of a method for smart gas pipeline frost heave safety management according to some embodiments of the present disclosure.

FIG. 2 is an exemplary flowchart illustrating a process of a method for smart gas pipeline frost heave safety management according to some embodiments of the present disclosure. As shown in FIG. 2, process 200 includes the following steps. In some embodiments, process 200 can be executed by the Internet of Things system for smart gas pipeline frost heave safety management.

Step 210, obtaining gas transmission data and gas pipeline data, and determining gas pressure change data of a target point based on the gas transmission data and the gas pipeline data.

Gas transmission data refers to data related to gas transmission. For example, the gas transmission data may include gas flow, gas flow velocity, gas pressure at different positions, gas temperature, or the like. The gas flow refers to the amount of gas fluid flowing through the effective section of the gas pipeline per unit time. The gas flow velocity refers to the distance that the gas passes in unit time. The gas pressure refers to the force between the gas and the inner wall of the gas pipeline. The gas temperature indicates degree of heating or cooling of the gas.

In some embodiments, gas transmission data may be obtained by a plurality of gas transmission sensors. For example, the gas transmission data may be monitored and obtained by the gas transmission sensors of the smart gas pipeline network equipment object sub-platform. In some embodiments, the gas transmission sensor of the smart gas pipeline network equipment object sub-platform receives the instruction for obtaining gas transmission data sent by the smart gas pipeline network equipment sensor network sub-platform and uploads the gas transmission data to the corresponding smart gas pipeline network equipment sensor network sub-platform.

Gas pipeline data refers to data related to pipelines for transmitting gas. For example, the gas pipeline data may include pipeline material, pipeline diameter, pipeline buried depth, pipeline valve quantity, pipeline position, etc.

In some embodiments, gas pipeline data may be obtained by a plurality of gas pipeline sensors. For example, the gas pipeline data may be monitored and obtained by the gas pipeline sensor of the smart gas pipeline network maintenance engineering sub-platform, and sent to the smart gas pipeline network maintenance engineering sensor network sub-platform. In some embodiments, gas pipeline data may also be obtained based on the smart gas pipeline network risk assessment management sub-platform. For example, the gas pipeline data of each pipeline may be obtained based on the pipeline network basic data management module.

The target point is the position in the pipeline that needs to be monitored for safety problems. Safety problems may at least include frost heave of pipelines, gas leakage, etc. For example, the gas pressure in the pipeline may change when the pipeline has frost heave or gas leakage, so the target point may include the position where the gas pressure in the pipeline changes. The number of target points may be one or more, which may be determined according to the actual monitoring situation of the gas pipeline.

The gas pressure change data is data characterizing the degree of change of the gas pressure of the target point. For example, the initial pressure of the target point (that is, the pressure at the beginning of pressure monitoring) is 2.5 Mpa, and the pressure change data of the target point at a certain time point may be 0.2 MPa lower than the initial pressure of the target point, 0.4 MPa higher than the initial pressure of the target point, etc. In some embodiments, the gas pressure change data may include pressure change data at multiple time points. For example, (0.2, 0.5, 0.8, 1.5) may represent that the degree of change of the four consecutive time points relative to the initial pressure is 0.2 MPa, 0.5 MPa, 0.8 MPa, 1.5 MPa.

In some embodiments, the gas pressure change data may be determined based on various methods. For example, the gas pressure change data may be determined based on the temperature model, that is, feature extraction is performed on the gas transmission data and gas pipeline data, and the extracted feature is input into the trained temperature model to obtain the gas pressure change data. For more information about the temperature model, please refer to the related description in FIG. 3.

In some embodiments, the gas pressure change data may also be determined based on simulation or emulation. For example, the gas transmission data and the gas pipeline data are input into the computer model for simulating or emulating the pipeline environment to obtain the gas pressure change data.

In some embodiments, the gas pressure change data may also be obtained based on the smart gas pipeline network object platform. For example, the smart gas pipeline network equipment object sub-platform receives the instruction for obtaining gas pressure change data sent by the smart gas pipeline network equipment sensor network sub-platform and uploads the gas pressure change data to the corresponding smart gas pipeline network equipment sensor network sub-platform.

Step 220, predicting a temperature change data of the target point based on the gas pressure change data.

The temperature change data is data characterizing the temperature change degree at the target point or near the target point. For example, the initial temperature of the target point (i.e., the temperature at the beginning of temperature monitoring) is −10° C., and the temperature change data of the target point at a certain time point may be: 2° C. lower than the initial temperature of the target point, 4° C. higher than the initial temperature of the target point, etc. In some embodiments, the temperature change data may include the temperature change degrees of multiple time points, for example, (−3, −5, −8, −15) may indicate that the change degrees of four consecutive time points relative to the initial temperature are −3° C., −5° C., −8° C., and −15° C. respectively.

In some embodiments, the temperature change data may include gas temperature change data and soil temperature change data. For more information about the gas temperature change data and soil temperature change data, please refer to the related descriptions of FIG. 3.

In some embodiments, the smart gas pipeline network safety management platform may predict the temperature change data of the target point based on the gas pressure change data. For example, the smart gas pipeline network safety management platform may establish the gas pressure-gas temperature relationship curve of the target point based on historical data, and predict the temperature change data of the target point based on the relationship curve. For another example, the smart gas pipeline network safety management platform may predict the temperature change data of the target point based on the model.

In some embodiments, the smart gas pipeline network safety management platform may predict the temperature change data of the target point through the temperature model based on the gas transmission data and the gas pipeline data. For more information about the temperature model, please refer to the relevant descriptions of FIG. 3.

Step 230, predicting, based on temperature change data, gas pipeline data, and gas pressure change data, and in combination with environmental data, a frost heave degree data of the target point.

Environmental data refers to the relevant data of the environment where the target point is located. For example, the environmental data of the target point may include the environmental temperature, weather, soil water content, soil type, etc.

In some embodiments, environmental data may be obtained by a plurality of environmental sensors. For example, the environment may be monitored and obtained by the environmental sensors of the smart gas pipeline network equipment object sub-platform. In some embodiments, the smart gas pipeline network equipment object sub-platform receives the instruction for obtaining environmental data sent by the smart gas pipeline network equipment sensor network sub-platform and uploads the environmental data to the corresponding smart gas pipeline network equipment sensor network sub-platform.

Frost heave degree data is the data characterizing the severity of frost heave at the target point. For example, frost heave degree data may include frost heave range and frost heave severity. The frost heave range may include the length and depth of the frost heave, and the frost heave severity may include whether it causes surface uplift or pipeline deformation and damage.

In some embodiments, the smart gas pipeline network safety management platform may predict the frost heave degree data of the target point. For example, the smart gas pipeline network safety management platform may build a vector database based on the gas pipeline data and historical data of the target point (for example, historical temperature change data, historical gas pressure change data, historical environmental data, historical frost heave degree data, etc.), and predict the frost heave degree data of the target point based on vector matching. For another example, the smart gas pipeline network safety management platform may predict the frost heave degree data of the target point based on the model. For more information about predicting frost heave data of target points based on the model, please refer to the related descriptions of FIG. 4.

In some embodiments, the smart gas pipeline network safety management platform may determine the initial frost heave range based on gas transmission data, gas pipeline data, and gas temperature change data, adjust the initial frost heave range based on environmental data, and determine the frost heave degree data of the target point.

The gas temperature change data is data characterizing the change degree of the gas temperature of the target point. For example, the initial gas temperature of the target point (i.e., the gas temperature before pressure regulation) is −15° C., and the gas temperature change data of the target point at a certain time point may be: 3° C. lower than the initial gas temperature of the target point, 5° C. higher than the initial gas temperature of the target point, etc. In some embodiments, the gas temperature change data may include the gas temperature change degrees at multiple time points, for example, (−2, −4, −8, −12) may indicate that the gas temperature change degrees at four consecutive time points are −2° C., −4° C., −8° C., and −12° C., respectively.

The initial frost heave range refers to the data preliminarily determined to characterize the frost heave severity according to the gas transmission data, gas pipeline data, and gas temperature change data. For example, the initial frost heave range may include frost heave length, frost heave depth, or the like.

In some embodiments, the smart gas pipeline network safety management platform may determine the initial frost heave range based on gas transmission data, gas pipeline data, and gas temperature change data. For example, the smart gas network safety management platform may build a vector database based on the gas pipeline data and historical data of the target point (for example, historical gas temperature change data, historical gas transportation data, historical initial frost heave range, etc.), and determine the initial frost heave range based on vector matching. For another example, the smart gas pipeline network safety management platform may predict the initial frost heave range of the target point based on the model.

In some embodiments, the smart gas pipeline network safety management platform may adjust the initial frost heave range based on the environmental data and determine the frost heave degree data. For example, it may be determined whether the frost heave causes surface uplift or pipeline deformation and damage according to the soil type, the initial frost heave range is adjusted, so as to determine the actual frost heave degree data. If the soil is hard, the surface deformation degree is relatively low, and the corresponding frost heave degree is relatively light. For another example, possible differences of frost heave degrees under different temperatures and/or different weathers may be determined according to ambient temperature and/or weather, so as to more accurately determine frost heave degree data.

In some embodiments, the smart gas pipeline network safety management platform may determine the frost heave degree data based on the frost heave model. For more details about the frost heave model, please refer to the related descriptions of FIG. 4.

Step 240, determining, based on the frost heave degree data of the target point, the gas transmission adjustment data and a frost heave prevention plan.

Gas transmission adjustment data refers to related data used to adjust the gas transmission data. For example, the gas transmission adjustment data may include adjusted gas flow and gas pressure.

In some embodiments, the gas transmission adjustment data may be determined based on various methods. For example, the smart gas pipeline network safety management platform may first adjust the gas transmission data based on the target point with the most severe frost heave and then determine the gas transmission adjustment data. For example, a table of historical frost heave degree data-historical gas transmission adjustment data may be established based on the historical management data of gas pipelines, and the frost heave degree data may be input into the table for matching, and the matched historical gas transmission adjustment data may be determined as gas transmission adjustment data.

The frost heave prevention plan refers to the solution used to prevent frost heave at the target point. For example, the frost heave prevention plan may include a plurality of treatment ranges and treatment methods, and different frost heave ranges and different frost heave severities correspond to different treatment ranges and treatment methods. The treatment methods may include soil replacement, adding an isolation layer/insulation layer/insulation layer, waterproof treatment, artificial heating measures, etc.

In some embodiments, the smart gas pipeline network safety management platform may establish a vector database based on environmental data and historical data (for example, historical gas transmission data, historical temperature change data, historical frost heave prevention plan, etc.), and determine the frost heave prevention plan by vector matching. For example, if the soil has a high moisture content, the frost heave prevention plan may include waterproofing. If the soil is prone to frost heave, the frost heave prevention plan may include replacing with other types of soil.

In some embodiments, the smart gas pipeline network safety management platform may determine the gas transmission adjustment data based on the frost heave degree data of the target point, determine the temperature change update data through a temperature model based on the gas transmission adjustment data, determine the frost heave degree update data based on the adjusted temperature change data through the frost heave model, and determine the frost heave prevention plan based on the frost heave degree update data. For more information about determining the frost heave prevention plan, please refer to the related descriptions of FIG. 5.

The method for smart gas pipeline frost heave safety management in some embodiments of the present disclosure realizes the effective adjustment of gas transmission by predicting the frost heave degree data of the target point and determining the gas transmission adjustment data and frost heave prevention plan, thereby effectively avoiding frost heave of the gas pipelines.

It should be noted that the above description of process 200 is only for example and explanation, and does not limit the scope of application of this disclosure. For those skilled in the art, various modifications and changes may be made to the process 200 under the guidance of the present disclosure. However, such modifications and changes are still within the scope of the present disclosure.

Figure 3:
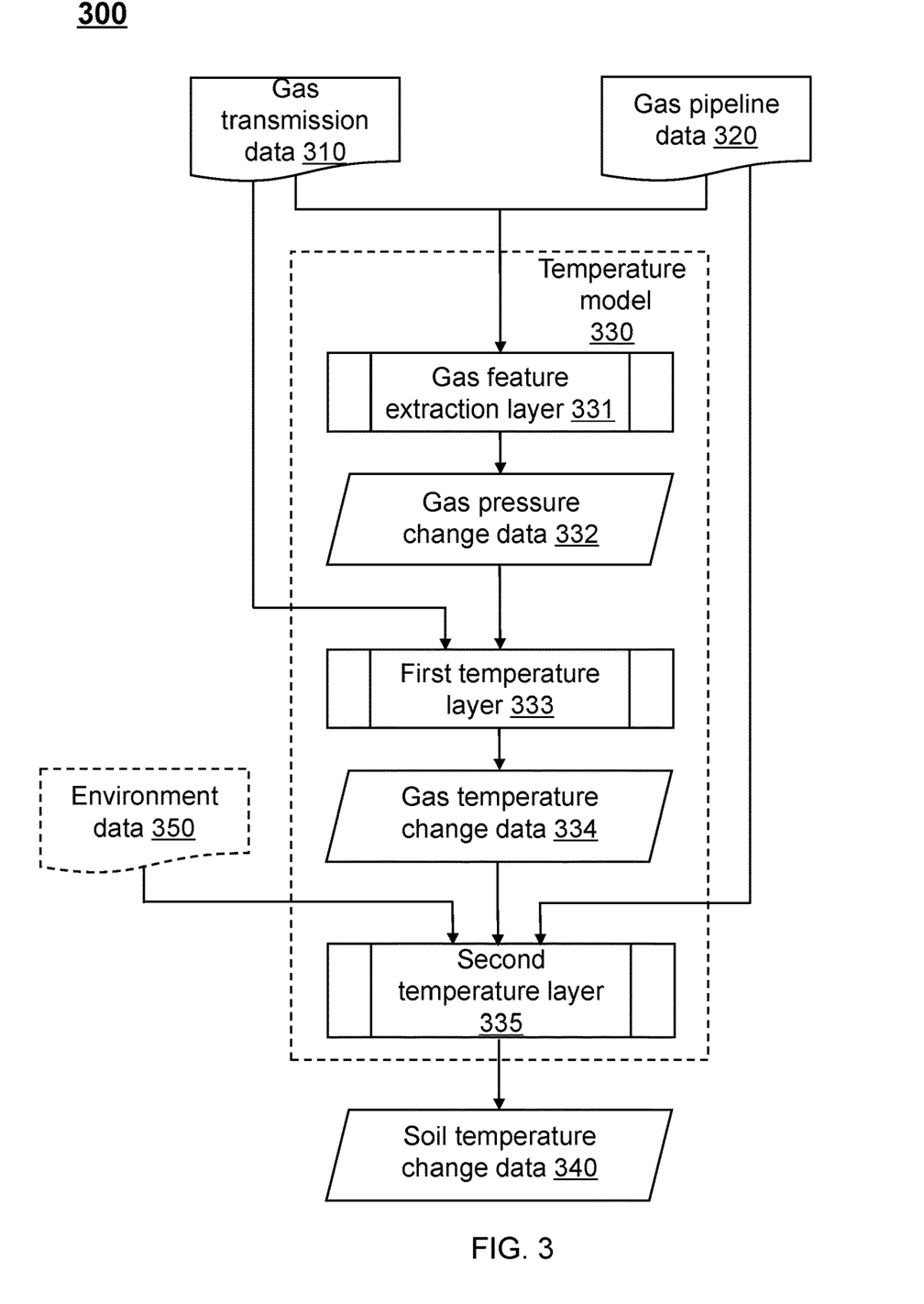
FIG. 3 is a schematic diagram of a temperature model according to some embodiments of the present disclosure.

FIG. 3 is a schematic diagram of a temperature model according to some embodiments of the present disclosure. As shown in FIG. 3, process 300 of executing and training of the temperature model at least includes the following contents.

In some embodiments, the smart gas pipeline network risk assessment management sub-platform may predict the temperature change data of the target point through a temperature model at least based on the gas pressure change data. The temperature model may be a machine learning model.

The temperature model 330 is a model for predicting temperature change data of a target point. In some embodiments, the temperature model may include a convolutional neural network model or a deep neural network model.

In some embodiments, the input of temperature model 330 may include gas transmission data 310 and gas pipeline data 320. For more information about gas transmission data and gas pipeline data, please refer to the related descriptions of FIG. 2.

In some embodiments, the output of the temperature model 330 may include gas temperature change data and soil temperature change data.

The gas temperature change data is usually the data characterizing the degree of gas temperature change at the target point. For example, the gas temperature change data may include the temperature change data of the gas in the pipeline at a plurality of time points compared with the initial gas temperature of the target point.

The gas temperature change data may be represented by a vector, and different elements in the vector represent the change data of the gas temperature at different time points. For example, if the initial gas temperature is 15° C., the gas temperature is 12° C. after 1 hour, 9° C. after 2 hours, 6° C. after 3 hours, 3° C. after 4 hours, etc., then the gas temperature change data may be expressed as (−3, −6, −9, −12), which may indicate that the decrease ranges of temperature at four consecutive time points are −3° C., −6° C., −9° C., and −12° C., respectively. The time point may be manually set (such as 10 minutes, or half an hour, etc.), and the time point may also be set as multiple (such as 6). That is, when the time point is set as half an hour and the number of time point is 6, the gas temperature change data may be expressed as (−1.5, −3, −4.5, −6, −7.5, −9), indicating that the gas temperature drops by −1.5° C. every half hour compared with the initial gas temperature. It can be understood that the gas temperature change data may also be expressed in other ways.

The soil temperature change data is usually the data characterizing the soil temperature change around the target point. For example, the soil temperature change data may include the temperature change data of the soil around the gas pipeline network at a plurality of time points compared with the initial soil temperature.

Similar to the gas temperature change data, the soil temperature change data may also be expressed by vector, and different elements in the vector represent the gas temperature change data at different time points. For more details, please refer to the above descriptions of gas temperature change data.

In some embodiments, the temperature model may include a gas feature extraction layer 331, a first temperature layer 333, and a second temperature layer 335. In some embodiments, the gas feature extraction layer 331, the first temperature layer 333, and the second temperature layer 335 may be a convolutional neural network or a deep neural network or a model obtained by a combination thereof.

In some embodiments, the input of the gas feature extraction layer 331 may include gas transmission data 310 and gas pipeline data 320, and the output of the gas feature extraction layer 331 may include gas pressure change data 332.

In some embodiments, the output of the gas feature extraction layer 331 may be used as the input of the first temperature layer 333. In some embodiments, the input of the first temperature layer 333 may include gas transmission data 310 and gas pressure change data 332, and the output of the first temperature layer 333 may include gas temperature change data 334.

In some embodiments, the output of the first temperature layer 333 may be used as the input of the second temperature layer 335. In some embodiments, the input of the second temperature layer 335 may include gas pipeline data 320 and gas temperature change data 334, and the output of the second temperature layer 335 may include soil temperature change data 340.

In some embodiments, the input of the temperature model may also include environmental data. As the input of the second temperature layer 335, the environmental data may be used together with the gas temperature change data and the gas pipeline data to determine the soil temperature change data near the target point.

When predicting soil temperature change data based on the temperature model, by considering environmental factors, the soil temperature predicted by the model can be more in line with the actual situation, and the accuracy of the model prediction can be improved.

In some embodiments, the temperature model may be obtained through jointly training the gas feature extraction layer 331, the first temperature layer 333, and the second temperature layer 335.

In some embodiments, the sample data for joint training of the gas feature extraction layer 331, the first temperature layer 333, and the second temperature layer 335 includes sample gas transmission data and sample gas pipeline data, and the label is the actual temperature change data of the sample soil. Training samples and labels may be retrieved from storage equipment or databases, and labels may be obtained based on manual annotation. The sample gas transmission data and sample gas pipeline data are input into the initial gas feature extraction layer, the output of the initial gas feature extraction layer and sample gas transmission data are input into the initial first temperature layer, and the output of the initial first temperature layer is input into the initial second temperature layer, and finally the soil temperature change data output by the initial second temperature layer is obtained. Based on the soil temperature change data output from the initial second temperature layer and the actual temperature change data of the sample soil, a loss function is constructed, and the initial gas feature extraction layer, the initial first temperature layer, and the initial second temperature layer are iteratively updated based on the loss function until the preset condition is met and the training is completed, and the trained temperature model is obtained. The preset condition may be that the loss function is smaller than a threshold, converges, or the training period reaches the threshold.

In some embodiments, the joint training samples also include sample environment data. When training the temperature model, the sample environment data and the output of the initial first temperature layer may be used as the input of the initial second temperature layer.

In some embodiments, the temperature model may be obtained based on training the gas feature extraction layer 331, the first temperature layer 333, and the second temperature layer 335 separately.

In some embodiments, the sample data for separate training of the gas feature extraction layer 331 includes sample gas transmission data, sample gas pipeline data, and the label is the actual pressure change data of the sample gas. Training samples and labels may be retrieved from storage equipment or databases, and labels may be obtained based on manual annotation. The sample gas transmission data and sample gas pipeline data are input into the initial gas feature extraction layer, a loss function is constructed based on the output of the initial gas feature extraction layer and the actual pressure change data of the sample gas, and the initial gas feature extraction layer is iteratively updated based on the loss function until the preset condition is met and the training is completed, and the trained gas feature extraction layer 331 is obtained.

In some embodiments, the sample data for separately training the first temperature layer 333 includes sample gas transmission data and sample gas pressure change data, and the label is the sample gas actual temperature change data. Training samples and labels may be retrieved from storage equipment or databases, and labels may be obtained based on manual annotation. The trained first temperature layer 333 may be obtained through a training process similar to that of the gas feature extraction layer 331. For the training process of the gas feature extraction layer 331, please refer to the relevant descriptions above.

In some embodiments, the sample data for separate training of the second temperature layer 335 includes sample gas pipeline data and sample temperature and pressure change data, and the label is the actual temperature change data of the sample soil. Training samples and labels may be retrieved from storage equipment or databases, and labels may be obtained based on manual annotation. In some embodiments, the sample data of the second temperature layer may also include sample environment data. The trained second temperature layer 335 may be obtained through a training process similar to that of the gas feature extraction layer 331. For the training process of the gas feature extraction layer 331, please refer to the relevant descriptions above.

In some embodiments of the present disclosure, the gas pressure change data may be extracted relatively quickly and accurately through the trained temperature model, and then the temperature change data of the target point may be predicted more accurately. When the temperature model is used to predict the soil temperature change data, the gas pipeline data factors are considered, that is, when the gas temperature changes, the diameter and material of the pipeline are different, and the soil temperature changes around the pipeline may be different, so that the predicted soil temperature change data is more accurate.

Figure 4:
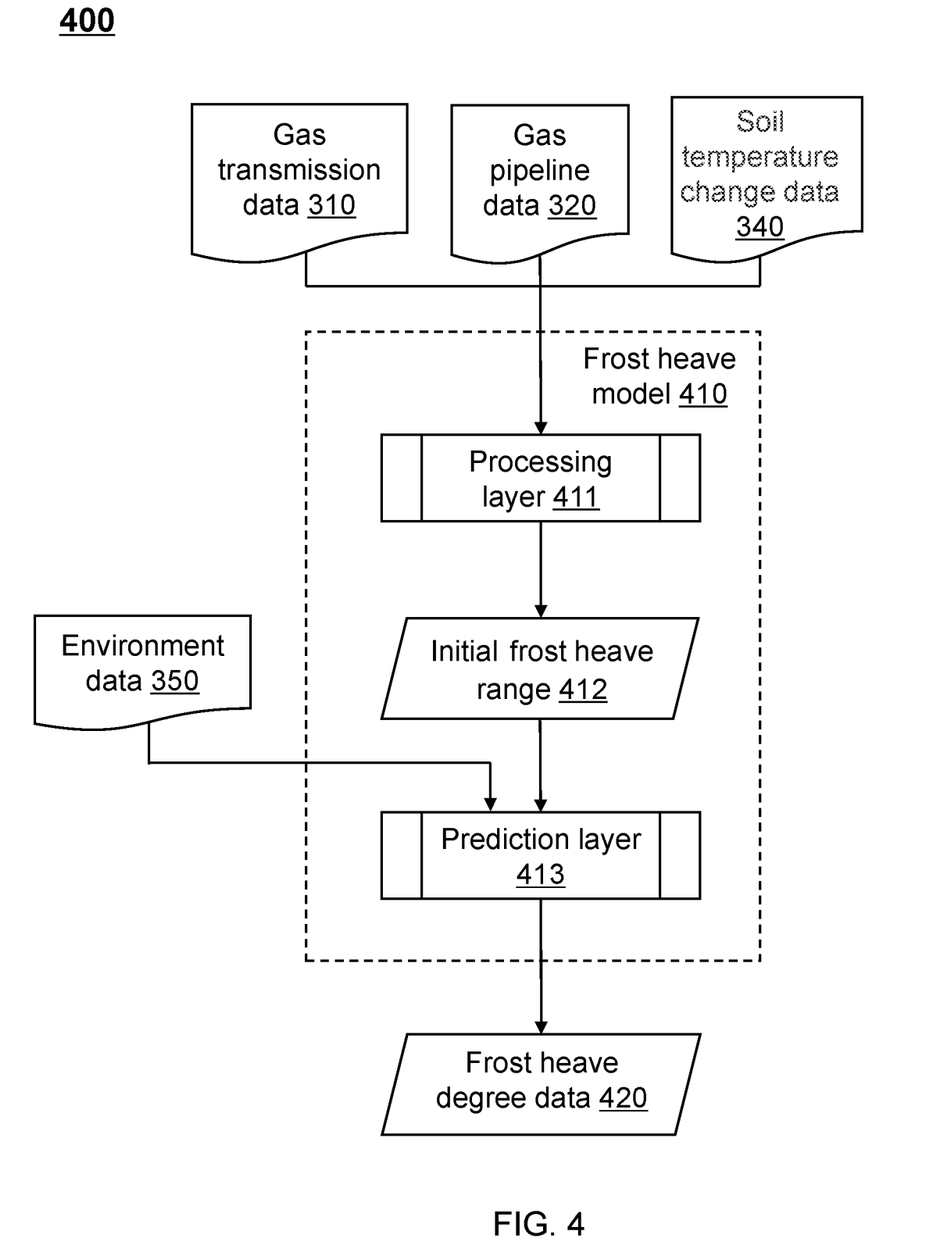
FIG. 4 is a schematic diagram of a frost heave model according to some embodiments of the present disclosure.

FIG. 4 is a schematic diagram of a frost heave model according to some embodiments of the present disclosure. As shown in FIG. 4, the process 400 of execution and training of the frost heave model may at least include the following contents.

In some embodiments, the smart gas pipeline network risk assessment management sub-platform may determine the frost heave degree data through the frost heave model based on the gas transmission data, gas pipeline data, and soil temperature change data. In some embodiments, the frost heave model may be a machine learning model.

The frost heave model 410 is a model for predicting frost heave degree data. In some embodiments, the frost heave model may include a convolutional neural network model or a deep neural network model.

In some embodiments, the input of the frost heave model 410 may include gas transmission data 310, gas pipeline data 320, soil temperature change data 340, and environment data 350. For more descriptions of gas transmission data, gas pipeline data, and environmental data, please refer to the relevant descriptions of FIG. 2. For more descriptions of soil temperature change data, please refer to the relevant descriptions of FIG. 3.

In some embodiments, a frost heave model may include a processing layer 411 and a prediction layer 413. In some embodiments, the processing layer 411 and the prediction layer 413 may be a convolutional neural network or a deep neural network, or a model obtained by a combination thereof.

In some embodiments, the input of the processing layer 411 may include the gas transmission data 310, the gas pipeline data 320, and the soil temperature change data 340, and the output of the processing layer 411 may include the initial frost heave range 412. The soil temperature change data 340 may be obtained from the output of the second temperature layer 335 of the temperature model 330.

In some embodiments, the output of the processing layer 411 may be used as the input of the prediction layer 413. In some embodiments, the input of prediction layer 413 may include environmental data 350 and initial frost heave range 412, and the output of prediction layer 413 may include frost heave degree data 420.

For more description about the initial frost heave range and frost heave degree data, please refer to the relevant descriptions of step 230 in FIG. 2.

In some embodiments, the frost heave model may be obtained through jointly training the processing layer 411 and the prediction layer 413.

In some embodiments, the sample data for jointly training the processing layer 411 and the prediction layer 413 includes sample gas transmission data, sample gas pipeline data, sample soil temperature change data, and sample environment data, and the label is sample frost heave degree data. Frost heave model may share training samples with temperature model. Training samples and labels may be retrieved from storage equipment or databases, and labels may be obtained based on manual annotation. The sample gas transmission data, sample gas pipeline data, and sample soil temperature change data are input into the processing layer 411, the sample environment data is input into the prediction layer 413, and finally the frost heave degree data output by the prediction layer 413 is obtained. A loss function is constructed based on the frost heave degree data and sample frost heave degree data, and the processing layer 411 and the prediction layer 413 are iteratively updated based on the loss function until the preset condition is met, the training is completed, and a trained frost heave model is obtained. The preset condition may be that the loss function is smaller than a threshold, converges, or the training period reaches the threshold.

In some embodiments, the temperature model may be obtained through separately training the processing layer 411 and the prediction layer 413. The process of separate training of the processing layer 411 and the prediction layer 413 is similar to the process of separate training each layer of the temperature model 330. For the process of separate training of the temperature model, refer to the relevant descriptions above.

In some embodiments of the present disclosure, the soil temperature change data is processed by the frost heave model, the initial frost heave range is determined first, and then the frost heave degree data is determined according to the initial frost heave range in combination with environmental data to meet the data processing requirements, which shortens the time for determining frost heave degree data compared with the method of obtaining frost heave degree data by mathematical calculation, and effectively improves the management efficiency of the method for gas pipeline frost heave safety management.

Figure 5:
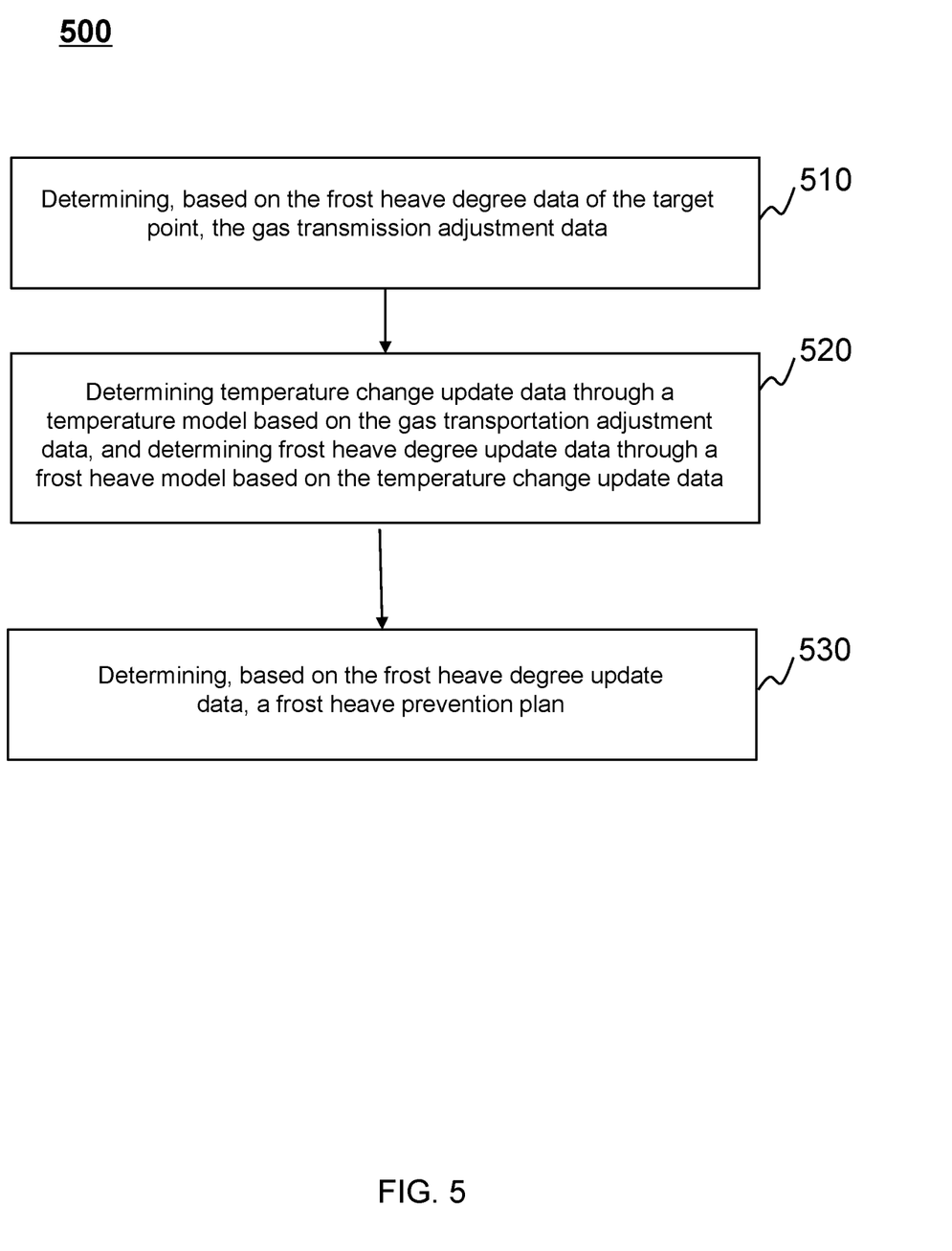
FIG. 5 is a schematic diagram of determining a frost heave prevention plan according to some embodiments of the present disclosure.

FIG. 5 is a schematic diagram of determining a frost heave prevention plan according to some embodiments of the present disclosure. As shown in FIG. 5, process 500 includes the following steps. In some embodiments, process 500 may be executed by the smart gas pipeline network risk assessment management sub-platform.

Step 510, determining, based on the frost heave degree data of the target point, the gas transmission adjustment data.

In some embodiments, the smart gas pipeline network risk assessment management sub-platform may determine the gas transmission adjustment data based on the frost heave degree data of the target point. For more description about determining, based on the frost heave degree data of the target point, the gas transmission adjustment data, refer to the relevant descriptions of step 240 in FIG. 2.

Step 520, determining temperature change update data through a temperature model based on the gas transmission adjustment data, and determining frost heave degree update data through a frost heave model based on the temperature change update data.

The temperature change update data may refer to updated temperature change data based on the gas transmission adjustment data. In some embodiments, the temperature change update data may include gas temperature change update data and soil temperature change update data. The gas temperature change update data refers to new gas temperature change data when the gas transmission is performed based on the gas transmission adjustment data. Similar to the gas temperature change data, the gas temperature change update data may include the update data of the gas temperature change degree at a plurality of time points, for example, (−1, −2, −2.5, −3) may represent the gas temperature change degrees at four consecutive time points relative to the initial temperature are −1° C., −2° C., −2.5° C., and −3° C., respectively after adjusting gas transmission data. The soil temperature change update data refers to the new soil temperature change data when gas transmission is performed based on the gas transmission adjustment data. Similar to the soil temperature change data, the soil temperature change data may include the soil temperature change degrees at multiple time points. For example, (−2, −3, −5, −8) may indicate that the soil temperature change degrees at four consecutive time points relative to the initial temperature are −2° C., −3° C., −5° C., and −8° C., respectively after adjusting the gas transmission data.

In some embodiments, temperature change update data (i.e., gas temperature change update data and soil temperature change update data) may be obtained based on gas transmission adjustment data, gas pipeline data, and environmental data through a temperature model. In some embodiments, the foregoing temperature model may be a machine learning model, specifically, which may be the temperature model 330 in FIG. 3 of the present disclosure. For example, gas transmission adjustment data and gas pipeline data are input into the temperature model 330, and updated gas pressure change data is obtained through the gas feature extraction layer 331. The updated gas pressure change data and gas transmission adjustment data are input into the first temperature layer to obtain the gas temperature change update data. The gas temperature change update data and environmental data are input into the second temperature layer to obtain soil temperature change update data.

The frost heave degree update data refers to the frost heave degree data re-predicted based on the gas transmission adjustment data and the soil temperature change update data. The frost heave degree update data may include an updated frost heave range and an updated frost heave severity. The frost heave range may include the length and depth of the frost heave, and the frost heave severity may include whether it causes surface uplift or pipeline deformation and damage. The frost heave degree update data may be represented by vectors, for example, (1, 0.2, 0, 1) may represent a frost heave degree update data, the first element in the vector indicates that the frost heave length is 1 m, the second element in the vector indicates that the frost heave depth is 0.2 m, the third element in the vector and the fourth element in the vector respectively indicate whether there is surface uplift and pipeline deformation, and 1 indicates that there is surface uplift and pipeline deformation, and 0 indicates that there is no surface uplift and pipeline deformation. That is, in the above frost heave degree update data, it is indicated that there is no surface uplift and pipeline deformation at the target point. The frost heave degree update data may also be expressed in other ways or include other data that may reflect the frost heave degree, which may be determined according to actual needs.

In some embodiments, the frost heave degree update data may be obtained through a frost heave model based on the gas transmission adjustment data, soil temperature change update data, gas pipeline data, and environmental data. In some embodiments, the foregoing frost heave model may be a machine learning model, specifically, which may be the frost heave model 410 in FIG. 4 of the present disclosure. For example, the gas transmission adjustment data, gas pipeline data, and soil temperature change update data are input into the frost heave model 410, the initial frost heave range is obtained through the processing layer 411, and the initial frost heave range and environmental data are input into the prediction layer to obtain the frost heave degree update data.

Step 530, determining, based on the frost heave degree update data, a frost heave prevention plan.

In some embodiments, the smart gas pipeline network risk assessment management sub-platform may determine the frost heave degree update data based on the gas transmission adjustment data, and determine the frost heave prevention plan corresponding to the adjusted gas transmission data according to the frost heave degree update data.

Frost heave prevention plan includes treatment range and treatment method. According to the updated frost heave range and the updated frost heave severity in the frost heave degree update data, different frost heave ranges and different frost heave severity correspond to different treatment ranges and treatment methods. For example, the frost heave range is a length range of 500 m along the front and back of the gas pipeline with the target point as the midpoint, and a range less than or equal to 1 m from the outer surface of the gas pipeline, the treatment range in the frost heave prevention plan is a length range of 500 m along the front and back of the gas pipeline with the target point as the midpoint and a range less than or equal to 1 m from the outer surface of the gas pipeline. For another example, if the frost heave severity is severe (causing surface uplift or pipeline deformation and damage, etc.), then treatment method is taken to avoid frost heave in the soil. Treatment method to avoid frost heave in soil may include soil replacement, adding an isolation layer, thermal insulation layer, and insulation layer on the periphery of the gas pipeline at the target point, waterproofing treatment of the soil (e.g., covering the soil surface with a tarp to prevent rainwater penetration), implementing artificial heating measures, etc. For the specific content of the frost heave prevention plan, refer to its related descriptions of FIG. 2.

In some embodiments, a historical database may be established based on historical frost heave treatment data, and a frost heave prevention plan may be determined by means of vector matching. For example, a comparative analysis is made to determine the frost heave prevention plan based on the current frost heave degree update data and the historical frost heave degree update data. In some embodiments, vectors $A_i$ (i=1, 2, 3, . . . , n) may be constructed based on historical frost heave degree update data, where i is the number of historical frost heave degree update data, and each vector $A_i$ corresponds to a historical frost heave prevention plan to form a historical database. The historical frost heave degree update data may be data representing different frost heave ranges and different frost heave severity. Environmental data may be considered when building a historical database. For example, vector elements may include (the length of the frost heave range, depth of the frost heave range, degree of surface uplift, degree of pipeline deformation, and soil moisture content).

As an example only, when the vector is (500, 1, 1, 1, 10), it means that in the historical frost heave degree update data, the frost heave range is a length range of 500 m along the front and back of the gas pipeline with the target point as the midpoint, and the range less than or equal to 1 m from the outer surface of the gas pipeline. If the surface uplift degree is level 1, the pipeline deformation degree is level 1, and the soil moisture content is 10%, the corresponding frost heave prevention plan is (500, 1, A), which means that the treatment range in the frost heave prevention plan is a length range of 500 m along the front and back of the gas pipeline with the target point as the midpoint, and a range less than or equal to 1 m from the outer surface of the gas pipeline, and the treatment method A is adopted, the treatment method A is to add an insulation layer around the target point pipeline.

The current frost heave degree update data is used to construct a vector B with the same format, and the vector B is matched with the vector $A_i$ in the historical database. For example, the vector distance between vector B and Ai is calculated, and the vector Ai whose vector distance from vector B is smaller than the distance threshold as a matching vector, then the historical frost heave treatment plan corresponding to vector Ai is used as the frost heave prevention plan for the current frost heave degree update data. The vector distance may include various types, for example, Euclidean distance, cosine distance, Markov distance, Chebyshev distance, Manhattan distance, or the like.

The historical frost heave degree update data and the historical frost heave prevention plan are used to establish a historical database, which may quickly determine the frost heave prevention plan corresponding to the current frost heave degree update data, and considering environmental factors when establishing the historical database can make the historical database more in line with the actual situation.

In some embodiments, the non-transitory computer-readable storage medium may store computer instructions, and when the computer reads the computer instructions in the storage medium, the computer executes the method for gas pipeline frost heave safety management.

The basic concept has been described above. Obviously, for the technicians skilled in the arts, the above detailed disclosure is only used as an example, and does not constitute a limitation of the present disclosure. Although not explicitly described herein, various modifications, improvements, and corrections to this disclosure may occur to the technicians skilled in the art. Such modifications, improvements, and corrections are suggested in this disclosure and thereof remain within the spirit and scope of the exemplary embodiments of this disclosure.

Meanwhile, the present disclosure uses specific words to describe the embodiments of the present disclosure. For example, "one embodiment", "an embodiment", and/or "some embodiments" refer to a certain feature, structure, or characteristic associated with at least one embodiment of this disclosure. Therefore, it should be emphasized and noted that two or more references to "an embodiment" or "one embodiment" or "an alternative embodiment" in various places in this specification are not necessarily referring to the same embodiment. In addition, some features, structures, or characteristics of one or more embodiments in this disclosure may be properly combined.

Furthermore, unless explicitly stated in the claims, the order of processing elements and sequences described in this disclosure, the use of numbers and letters or the use of other names is not intended to limit the order of the processes and methods of this disclosure. While the foregoing disclosure discusses by way of various examples of the disclosure presently believed to be useful, it is to be understood that such details are for purposes of illustration only and that the appended claims are not limited to the disclosed embodiments, but rather are intended to cover all modifications and equivalent combinations that fall within the essence and scope of the embodiments of this disclosure. For example, although the system components described above may be implemented by hardware equipment, they may also be implemented by a software-only solution, such as installing the described system on an existing server or mobile equipment.

Similarly, it should be noted that, in order to simplify the expressions disclosed in this disclosure and thus help the understanding of one or more embodiments of the disclosure, in the foregoing description of the embodiments of this disclosure, various features may sometimes be combined into one embodiment, in the drawings or descriptions thereof. However, this method of disclosure does not imply that the subject matter of the description requires more features than are recited in the claims. Indeed, embodiment features are less than all features of a single foregoing disclosed embodiment.

Some examples use numbers to describe quantities of ingredients and attributes, it should be understood that such numbers used to describe the examples, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the specification and claims are approximations that can vary depending upon the desired characteristics of individual embodiments. In some embodiments, the numerical parameters should take into account the specified significant digits and use a general digit reservation method. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as an article, a book, a specification, a publication, a document, etc., cited in this disclosure, the entire contents are hereby incorporated into this disclosure for reference. Application history documents that are inconsistent with or conflict with the contents of this disclosure are excluded, and documents (currently or hereafter appended to this disclosure) limiting the broadest scope of the claims of this disclosure are also excluded. It should be noted that, if there is any inconsistency or conflict between the descriptions, definitions and/or use of terms in the accompanying materials of this disclosure and the contents of this disclosure, the descriptions, definitions and/or use of terms in this disclosure shall prevail.

Finally, it should be understood that the embodiments described in this disclosure are only intended to illustrate the principles of the embodiments of this disclosure. Other variants may also belong to the scope of this disclosure. Accordingly, by way of example and not limitation, alternative configurations of the embodiments of this disclosure may be considered consistent with the instruction of this disclosure. Accordingly, the embodiments of this disclosure are not limited to those expressly introduced and described in this disclosure.

What is claimed is:

1. A method for frost heave prevention treatment of a smart gas pipeline, wherein the method is executed based on a smart gas pipeline network safety management platform of an Internet of Things system for frost heave prevention treatment of the smart gas pipeline, and the method comprises:

determining gas pressure change data of a target point based on gas transmission data of the target point and gas pipeline data of the target point;

predicting temperature change data of the target point through a temperature model based on the gas pressure change data of the target point, wherein the temperature change data of the target point includes gas temperature change data and soil temperature change data, and the temperature model is a machine learning model, wherein the temperature model at least includes a gas feature extraction layer, a first temperature layer, and a second temperature layer;

an input of the gas feature extraction layer includes the gas transmission data of the target point and the gas pipeline data of the target point, and an output of the gas feature extraction layer includes the gas pressure change data of the target point;

an input of the first temperature layer includes the gas pressure change data of the target point and the gas transmission data of the target point, and an output of the first temperature layer includes the gas temperature change data; and an input of the second temperature layer includes the gas temperature change data and the gas pipeline data of the target point, and an output of the second temperature layer includes the soil temperature change data; and predicting, based on the temperature change data of the target point, the gas pipeline data of the target point, and the gas pressure change data of the target point, and in combination with environmental data of the target point, frost heave degree data of the target point.

2. The method for frost heave prevention treatment of the smart gas pipeline according to claim 1, wherein the temperature model is obtained by jointly training the gas feature extraction layer, the first temperature layer, and the second temperature layer based on training samples and labels, the training samples include sample gas transmission data and sample gas pipeline data, the labels are actual temperature change data of sample soil, and the jointly training includes:

inputting the sample gas transmission data and the sample gas pipeline data into an initial gas feature extraction layer, inputting an output of the initial gas feature extraction layer and the sample gas transmission data into an initial first temperature layer, and inputting an output of the initial first temperature layer into an initial second temperature layer, and obtaining the soil temperature change data output by the initial second temperature layer;

constructing a loss function based on the soil temperature change data and the actual temperature change data of the sample soil; and iteratively updating the initial gas feature extraction layer, the initial first temperature layer, and the initial second temperature layer based on loss function.

3. The method for frost heave prevention treatment of the smart gas pipeline according to claim 1, wherein an input of the temperature model also includes the environmental data.

4. The method for frost heave prevention treatment of the smart gas pipeline according to claim 1, wherein the Internet of Things system for frost heave prevention treatment of the smart gas pipeline further includes a smart gas user platform, a smart gas service platform, a smart gas pipeline network sensor network platform, and a smart gas pipeline network object platform, the smart gas pipeline network safety management platform includes a smart gas pipeline network risk assessment management sub-platform and a smart gas data center, the smart gas pipeline network object platform is configured to obtain the gas transmission data of the target point and the gas pipeline data of the target point, which are transmitted to the smart gas pipeline network safety management platform through the smart gas pipeline network sensor network platform;

the method further comprises:
transmitting the frost heave degree data of the target point to the smart gas data center;
transmitting, by the smart gas data center, the frost heave degree data of the target point to the smart gas service platform; and
transmitting, by the smart gas service platform, the frost heave degree data of the target point to the smart gas user platform.

5. The method for frost heave prevention treatment of the smart gas pipeline according to claim 4, wherein the smart gas user platform includes a gas user sub-platform and a supervision user sub-platform;

the smart gas service platform includes a smart gas service sub-platform and a smart supervision service sub-platform;

the smart gas pipeline network sensor network platform includes a smart gas pipeline network equipment sensor network sub-platform and a smart gas pipeline network maintenance engineering sensor network sub platform; and the smart gas pipeline network object platform includes a smart gas pipeline network equipment object sub-platform and a smart gas pipeline network maintenance engineering object sub-platform.

6. The method for frost heave prevention treatment of the smart gas pipeline according to claim 1, further comprising:
determining gas transmission adjustment data based on the frost heave degree data of the target point;
determining temperature change update data through the temperature model based on the gas transmission adjustment data, and determining frost heave degree update data through a frost heave model based on the temperature change update data; and
determining a frost heave prevention plan based on the frost heave degree update data, wherein the frost heave model is a machine learning model.

7. The method for frost heave prevention treatment of the smart gas pipeline according to claim 6, wherein the determining a frost heave prevention plan based on the frost heave degree update data includes:
establishing a historical database based on historical frost heave treatment data, wherein the historical database stores vectors ($A_i$) constructed based on historical frost heave degree update data and historical frost heave prevention plans corresponding to the vectors ($A_i$); and
determining the frost heave prevention plan through constructing a vector (B) based on the frost heave degree update data and performing vector matching based on the vector (B) in the historical database.

8. The method for frost heave prevention treatment of the smart gas pipeline according to claim 6, wherein the frost heave prevention plan includes a plurality of treatment ranges and a plurality of treatment manners, different frost heave ranges and different frost heave severities correspond to different treatment ranges and different treatment manners, wherein
in response to surface uplift or pipeline deformation and damage caused by frost heave, the treatment manners include at least one of soil replacement, adding an isolation layer, a thermal insulation layer, or an insulation layer on a periphery of a gas pipeline at the target point, waterproofing treatment of soil, and implementing artificial heating.

9. An Internet of Things system for frost heave prevention treatment of a smart gas pipeline, wherein the Internet of Things system includes a smart gas user platform, a smart gas service platform, a smart gas pipeline network sensor network platform, a smart gas pipeline network safety management platform, and a smart gas pipeline network object platform, and the Internet of Things system is configured to:

determine gas pressure change data of a target point based on gas transmission data of the target point and gas pipeline data of the target point;

predict temperature change data of the target point through a temperature model based on the gas pressure change data of the target point, wherein the temperature change data of the target point includes gas temperature change data and soil temperature change data, and the temperature model is a machine learning model, wherein the temperature model at least includes a gas feature extraction layer, a first temperature layer, and a second temperature layer;

an input of the gas feature extraction layer includes the gas transmission data of the target point and the gas pipeline data of the target point, and an output of the gas feature extraction layer includes the gas pressure change data of the target point;

an input of the first temperature layer includes the gas pressure change data of the target point and the gas transmission data of the target point, and an output of the first temperature layer includes the gas temperature change data; and an input of the second temperature layer includes the gas temperature change data and the gas pipeline data of the target point, and an output of the second temperature layer includes the soil temperature change data; and predict, based on the temperature change data of the target point, the gas pipeline data of the target point, and the gas pressure change data of the target point, and in combination with environmental data of the target point, frost heave degree data of the target point.

10. The Internet of Things system for frost heave prevention treatment of the smart gas pipeline according to claim 9, wherein the temperature model is obtained by jointly training the gas feature extraction layer, the first temperature layer, and the second temperature layer based on training samples and labels, the training samples include sample gas transmission data and sample gas pipeline data, the labels are actual temperature change data of sample soil, and the jointly training includes:

inputting the sample gas transmission data and the sample gas pipeline data into an initial gas feature extraction layer, inputting an output of the initial gas feature extraction layer and the sample gas transmission data into an initial first temperature layer, and inputting an output of the initial first temperature layer into an initial second temperature layer, and obtaining the soil temperature change data output by the initial second temperature layer;

constructing a loss function based on the soil temperature change data and the actual temperature change data of the sample soil; and iteratively updating the initial gas feature extraction layer, the initial first temperature layer, and the initial second temperature layer based on loss function.

11. The Internet of Things system for frost heave prevention treatment of the smart gas pipeline according to claim 9, wherein an input of the temperature model also includes the environmental data.

12. The Internet of Things system for frost heave prevention treatment of the smart gas pipeline according to claim 9, wherein the smart gas pipeline network safety management platform includes a smart gas pipeline network risk assessment management sub-platform and a smart gas data center;

the smart gas pipeline network object platform is configured to obtain the gas transmission data of the target point and the gas pipeline data of the target point, and transmit the gas transmission data of the target point and the gas pipeline data of the target point to the smart gas pipeline network safety management platform through the smart gas pipeline network sensor network platform;

the smart gas pipeline network safety management platform is configured to transmit the frost heave degree data of the target point to the smart gas data center;

the smart gas data center is configured to transmit the frost heave degree data of the target point to the smart gas service platform; and the smart gas service platform is configured to transmit the frost heave degree data of the target point to the smart gas user platform.

13. The Internet of Things system for frost heave prevention treatment of the smart gas pipeline according to claim 12, wherein the smart gas user platform includes a gas user sub-platform and a supervision user sub-platform;

the smart gas service platform includes a smart gas service sub-platform and a smart supervision service sub-platform;

the smart gas pipeline network sensor network platform includes a smart gas pipeline network equipment sensor network sub-platform and a smart gas pipeline network maintenance engineering sensor network sub-platform; and the smart gas pipeline network object platform includes a smart gas pipeline network equipment object sub-platform and a smart gas pipeline network maintenance engineering object sub-platform.

14. The Internet of Things system for frost heave prevention treatment of the smart gas pipeline according to claim 9, wherein the Internet of Things system is further configured to:

determine gas transmission adjustment data based on the frost heave degree data of the target point;

determine temperature change update data through the temperature model based on the gas transmission adjustment data, and determine frost heave degree update data through a frost heave model based on the temperature change update data; and determine a frost heave prevention plan based on the frost heave degree update data, wherein the frost heave model is a machine learning model.

15. The Internet of Things system for frost heave prevention treatment of the smart gas pipeline according to claim 14, wherein the Internet of Things system is further configured to:

establish a historical database based on historical frost heave treatment data, wherein the historical database stores vectors ($A_i$) constructed based on historical frost heave degree update data and historical frost heave prevention plans corresponding to the vectors ($A_i$); and determine the frost heave prevention plan through constructing a vector (B) based on the frost heave degree update data and performing vector matching based on the vector (B) in the historical database.

16. The Internet of Things system for frost heave prevention treatment of the smart gas pipeline according to claim 14, wherein the frost heave prevention plan includes a plurality of treatment ranges and a plurality of treatment manners, different frost heave ranges and different frost heave severities correspond to different treatment ranges and different treatment manners, wherein in response to surface uplift or pipeline deformation and damage caused by frost heave, the treatment manners include at least one of soil replacement, adding an isolation layer, a thermal insulation layer, or an insulation layer on a periphery of a gas pipeline at the target point, waterproofing treatment of soil, and implementing artificial heating.

17. A non-transitory computer-readable storage medium storing computer instructions, wherein when a computer reads the computer instructions in the storage medium, the computer executes the method for frost heave prevention treatment of the smart gas pipeline according to claim 1.

* * * * *